(12) United States Patent
Tsutsumi et al.

(10) Patent No.: US 10,183,635 B2
(45) Date of Patent: Jan. 22, 2019

(54) DRAINAGE STRUCTURE FOR WINDSHIELD

(71) Applicant: HONDA MOTOR CO., LTD., Minato-Ku, Tokyo (JP)

(72) Inventors: Noriyuki Tsutsumi, Sakura (JP); Yoshikazu Umeda, Utsunomiya (JP); Koji Okabe, Yokohama (JP); Masaki Kawamura, Guanajuato (MX)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 15/554,072

(22) PCT Filed: Dec. 15, 2015

(86) PCT No.: PCT/JP2015/085091
§ 371 (c)(1),
(2) Date: Aug. 28, 2017

(87) PCT Pub. No.: WO2016/143216
PCT Pub. Date: Sep. 15, 2016

(65) Prior Publication Data
US 2018/0037175 A1 Feb. 8, 2018

(30) Foreign Application Priority Data
Mar. 6, 2015 (JP) .................. 2015-044892

(51) Int. Cl.
*B60K 37/00* (2006.01)
*B60R 13/07* (2006.01)
*B60J 1/02* (2006.01)

(52) U.S. Cl.
CPC ............. *B60R 13/07* (2013.01); *B60J 1/02* (2013.01)

(58) Field of Classification Search
CPC ....... B01D 35/153; B01D 35/16; B60S 1/381; B60S 1/4003; B60S 1/4006; B60S 1/3856;
(Continued)

(56) References Cited

U.S. PATENT DOCUMENTS 3,783,568 A * 1/1974 Adler .................... B60J 10/365
29/469
4,304,075 A * 12/1981 Miyoshi ................. B60J 10/265
52/716.6
(Continued)

FOREIGN PATENT DOCUMENTS

DE 3323006 A1 1/1985
DE 4141813 A1 6/1993
(Continued)

OTHER PUBLICATIONS

PCT/ISA/210 from PCT/JP2015/085091 and the English translation thereof.
(Continued)

*Primary Examiner* — Kiran B Patel
(74) *Attorney, Agent, or Firm* — Carrier Blackman & Associates, P.C.; Joseph P. Carrier; Fulchand P. Shende

(57) ABSTRACT

A drainage groove includes a basic groove portion that opens toward a front surface side of a windshield between a side end surface on the windshield side and an opposite wall of a front pillar; and an expansion groove recessed from a bottom side of the basic groove portion toward an inside of the windshield in the vehicle width direction. The drainage groove further includes a wall portion configured to protrude toward an opening side of the basic groove portion from a position in a bottom of the basic groove portion which is
(Continued)

spaced apart in the vehicle width direction from each of the side end surface on the windshield side and the opposite wall of the front pillar.

6 Claims, 3 Drawing Sheets

(58) Field of Classification Search
CPC .............. B60S 1/3867; H01H 2085/208; Y10T 29/49826; B62D 25/081
USPC .................................................... 296/208, 21
See application file for complete search history.

(56) References Cited

U.S. PATENT DOCUMENTS

| | | | | |
|---|---|---|---|---|
| 4,772,066 | A | * | 9/1988 | Leschke ................ B60J 1/2002 296/180.1 |
| 5,395,563 | A | * | 3/1995 | Goto .................. B29C 47/0023 156/244.13 |
| 5,480,504 | A | * | 1/1996 | Gold ........................ B60J 1/005 156/108 |
| 5,688,016 | A | * | 11/1997 | Gold ........................ B60J 10/27 296/93 |
| 6,409,244 | B1 | | 6/2002 | Nagahashi et al. |
| 8,186,749 | B2 | * | 5/2012 | Serizawa ............ B62D 25/081 296/192 |
| 2005/0151395 | A1 | * | 7/2005 | Hoefer ................ B60J 1/2002 296/208 |
| 2013/0113236 | A1 | * | 5/2013 | Oomen .................. B60J 10/84 296/192 |
| 2013/0119696 | A1 | * | 5/2013 | Baggett .................. B60J 1/006 296/96.21 |
| 2013/0300154 | A1 | * | 11/2013 | Schaefer ............ B62D 25/081 296/192 |
| 2014/0306480 | A1 | * | 10/2014 | Sasaki ...................... B60J 10/02 296/93 |
| 2016/0129771 | A1 | * | 5/2016 | Nakai ........................ B60J 1/02 296/93 |
| 2016/0229459 | A1 | * | 8/2016 | Ishihara ............... B62D 25/081 |
| 2016/0236720 | A1 | * | 8/2016 | Tsuneyama .......... B62D 25/081 |
| 2017/0028832 | A1 | * | 2/2017 | Sekishiro ................ B60J 10/70 |

FOREIGN PATENT DOCUMENTS

| | | |
|---|---|---|
| DE | 197 44 684 A1 | 4/1999 |
| EP | 0 945 296 A1 | 9/1999 |
| JP | 1-153325 A | 6/1989 |
| JP | 02-171315 A | 7/1990 |
| JP | 03-124908 U | 12/1991 |
| JP | 07-144543 A | 6/1995 |
| JP | 11-334358 A | 12/1999 |
| JP | 2001-171345 A | 6/2001 |
| JP | 2002-337545 A | 11/2002 |
| WO | 2010/130483 A1 | 11/2010 |

OTHER PUBLICATIONS

Office Action dated Mar. 13, 2018, issued in the corresponding Japanese Patent Application 2017-504572, and the English translation thereof.

* cited by examiner

DRAINAGE STRUCTURE FOR WINDSHIELD

TECHNICAL FIELD

The present invention relates to a drainage structure for a windshield which is disposed at a front of a vehicle cabin. Priority is claimed on Japanese Patent Application No. 2015-044892, filed Mar. 6, 2015, the content of which is incorporated herein by reference.

BACKGROUND ART

A drainage groove recessed toward an inside of a vehicle cabin extends substantially vertically between a side end surface on a windshield side disposed at a front of the vehicle cabin and a front pillar. The drainage groove captures water such as rainwater flowing out laterally from a front surface of the windshield and then discharges the water from a predetermined path of a front portion of a vehicle body in a downward direction of the vehicle body.

However, when a large amount of water such as rainwater flows into the drainage groove from the front surface of the windshield during travel of a vehicle or the like, the drainage groove may not capture all the water, and there is a possibility of the water being scattered to a side of the vehicle beyond the front pillar. Therefore, a countermeasure thereof has been conventionally devised (for example, refer to Patent Literature 1).

In the drainage structure for a windshield disclosed in Patent Literature 1, a plurality of ribs in an extending direction of the drainage groove protrude from a bottom of the drainage groove. When such a drainage structure is adopted and the water such as the rainwater flows into the drainage groove from the front surface of the windshield, the plurality of adjacent ribs induce a capillary phenomenon and smoothly guide the water flowing into the drainage groove in the downward direction of the drainage groove.

CITATION LIST

Patent Literature

[Patent Literature 1]
Japanese Unexamined Patent Application, First Publication No. H11-334358

SUMMARY OF INVENTION

Technical Problem

However, in the drainage structure for a windshield disclosed in Patent Literature 1, since the plurality of ribs are densely provided on the bottom of the drainage groove to induce a capillary phenomenon in the drainage groove, an effective cross section in the drainage groove capable of capturing the water is narrowed by the plurality of ribs. Therefore, when a large amount of water flows into the drainage groove from the front surface of the windshield during the travel of the vehicle, the water may not be completely treated by the drainage groove, and may thus overflow from the drainage groove and be scattered to the side of the vehicle.

The present invention is made in view of such problems, and an object of the present invention is to provide a drainage structure for a windshield which is capable of stably discharging a large amount of water through a drainage groove even when a large amount of water flows into the drainage groove from a front surface side of the windshield during travel of a vehicle.

Solution to Problem

In order to solve the above-described problems and achieve the object, the present invention adopts the following embodiment.

(1) A drainage structure for a windshield according to one aspect of the present invention includes a windshield disposed at a front of a vehicle cabin, a front pillar disposed outside the windshield in a vehicle width direction, and a drainage groove recessed concavely toward an inside of the vehicle cabin between the windshield and the front pillar and configured to discharge captured water downward, wherein the drainage groove includes a basic groove portion that opens toward a front surface side of the windshield between a side end surface on the windshield side and an opposite wall of the front pillar facing the side end surface, an expansion groove recessed concavely toward an inside of the windshield in the vehicle width direction from a bottom side of the basic groove portion, and a wall portion configured to protrude toward an opening side of the basic groove portion from a position of the bottom of the basic groove portion which is spaced apart in the vehicle width direction from each of the side end surface on the windshield side and the opposite wall of the front pillar.

With the constitution of (1), when the vehicle travels, travel wind which hits the front surface of the windshield passes over the front pillar from a side portion of the windshield and flows to the side of the vehicle body. A main flow of the travel wind draws air in the basic groove portion to follow the main flow in a region on the opening side of the basic groove portion of the drainage groove, and a first swirling flow which swirls in the basic groove portion is generated by the drawing.

The first swirling flow swirls to flow along the opposite wall of the front pillar toward the bottom of the basic groove portion and then to rise along the outer surface of the wall portion in the vehicle width direction. Additionally, a flow of the first swirling flow which rises along the outer surface of the wall portion in the vehicle width direction newly draws air in the drainage groove, and thus a second swirling flow which swirls in a region close to the expansion groove in the drainage groove is generated by the drawing. The second swirling flow swirls to flow from a portion of the opening of the basic groove portion close to the side end surface on the windshield side toward the inner wall side on the inner side of the expansion groove in the vehicle width direction and then to rise along the inner surface of the wall portion in the vehicle width direction.

Thus, the first swirling flow and the second swirling flow generated in the drainage groove by the main flow of the travel wind draw water such as rain water which hits the front surface of the windshield and flows near the side end surface into the basic groove portion and the expansion groove in the drainage groove. Therefore, when the vehicle travels, a large amount of water can be discharged through the drainage groove.

(2) In the aspect (1), a glass attachment wall extending toward a rear surface side of a side portion of the windshield may extend from the front pillar, a side edge portion of the windshield may be disposed to be spaced apart from the glass attachment wall toward a front side of a vehicle, and at least a part of the expansion groove may be provided in a separation space between the side edge portion of the windshield and the glass attachment wall.

In the case of (2), a cross-sectional area of the expansion groove can be secured using the separation space between the side edge portion of the windshield and the glass attachment wall. Therefore, the cross-sectional area of the drainage groove can be sufficiently secured at a portion of the expansion groove, and thus a width of the basic groove portion facing the outside of the vehicle body may be further reduced, or the opposite wall of the front pillar which faces the side end of the windshield may be further lowered. Therefore, appearance quality of the vehicle may be further improved by one or both cases.

(3) In the aspect (2), a portion of a rear surface of the windshield which is spaced inward from a side end of the windshield in the vehicle width direction may be supported by the glass attachment wall via a spacer, and an inner wall on an inner side of the expansion groove in the vehicle width direction may be constituted by an outer surface of the spacer in the vehicle width direction.

In the case of (3), since the spacer and the inner wall on the inner side of the expansion groove in the vehicle width direction are used in common, the number of parts can be reduced, and a product cost can be reduced.

(4) In one of the aspects (1) to (3), the wall portion may be provided at an approximate center position of the basic groove portion between the side end surface on the windshield side and the opposite wall of the front pillar.

In the case of (4), the first swirling flow which is generated by the main flow of the travel wind and rises from the opposite wall of the front pillar toward the bottom of the basic groove portion, specifically, along the outer surface of the wall portion in the vehicle width direction, and the second swirling flow which swirls in the expansion groove from the side end surface on the windshield side and rises along the inner surface of the wall portion in the vehicle width direction is divided at the approximate center position between the side end surface on the windshield side and the opposite wall of the front pillar. Accordingly, one of the first swirling flow and the second swirling flow is prevented from being drowned out by the other, and the first swirling flow and the second swirling flow are formed in a well-balanced manner.

(5) In one of the aspects (1) to (4), the wall portion may extend to a region closer to the opening than the expansion groove of the basic groove portion.

In the case of (5), since it is difficult for the first swirling flow flowing from the opposite wall of the front pillar toward the bottom of the basic groove portion to directly pass over an extending end of the wall portion and to enter the expansion groove side, the flow of the second swirling flow flowing from the side end surface on the windshield side toward the inside of the expansion groove is hardly obstructed.

(6) In the aspect (5), the extending end of the wall portion may be located at a position closer to the bottom of the basic groove portion than a center position in a forward and backward direction of the vehicle in the region closer to the opening than the expansion groove of the basic groove portion.

In the case of (6), the extending end of the wall portion becomes less visible from the outside through the opening of the basic groove portion.

Advantageous Effects of Invention

According to the aspect of the present invention, since the main flow of the travel wind generates the first swirling flow which swirls to flow to the bottom side of the basic groove portion along the opposite wall of the front pillar and then to rise along the outer surface of the wall portion in the vehicle width direction and the second swirling flow which swirls to flow from a portion near the side end surface on the windshield side toward the inner wall on the inner side of the expansion groove in the vehicle width direction and then to rise along the inner surface of the wall portion in the vehicle width direction during the travel of the vehicle, the first swirling flow and the second swirling flow can draw a large amount of water into the basic groove portion and the expansion groove of the drainage groove and can stably discharge the water through the drainage groove even when a large amount of water flows in the direction of the drainage groove from the front side of the windshield.

Therefore, according to the aspect of the present invention, since the water can be efficiently drawn into the drainage groove when the vehicle travels, the water that passes over the front pillar from the drainage groove and is scattered to the side of the vehicle body can be reduced, and a level difference between the side end surface on the windshield side and the front pillar can also be reduced, and thus occurrence of wind noise can be reduced, and an external appearance can be improved.

DESCRIPTION OF EMBODIMENT

Hereinafter, an embodiment of the present invention will be described with reference to the drawings.

Figure 1:
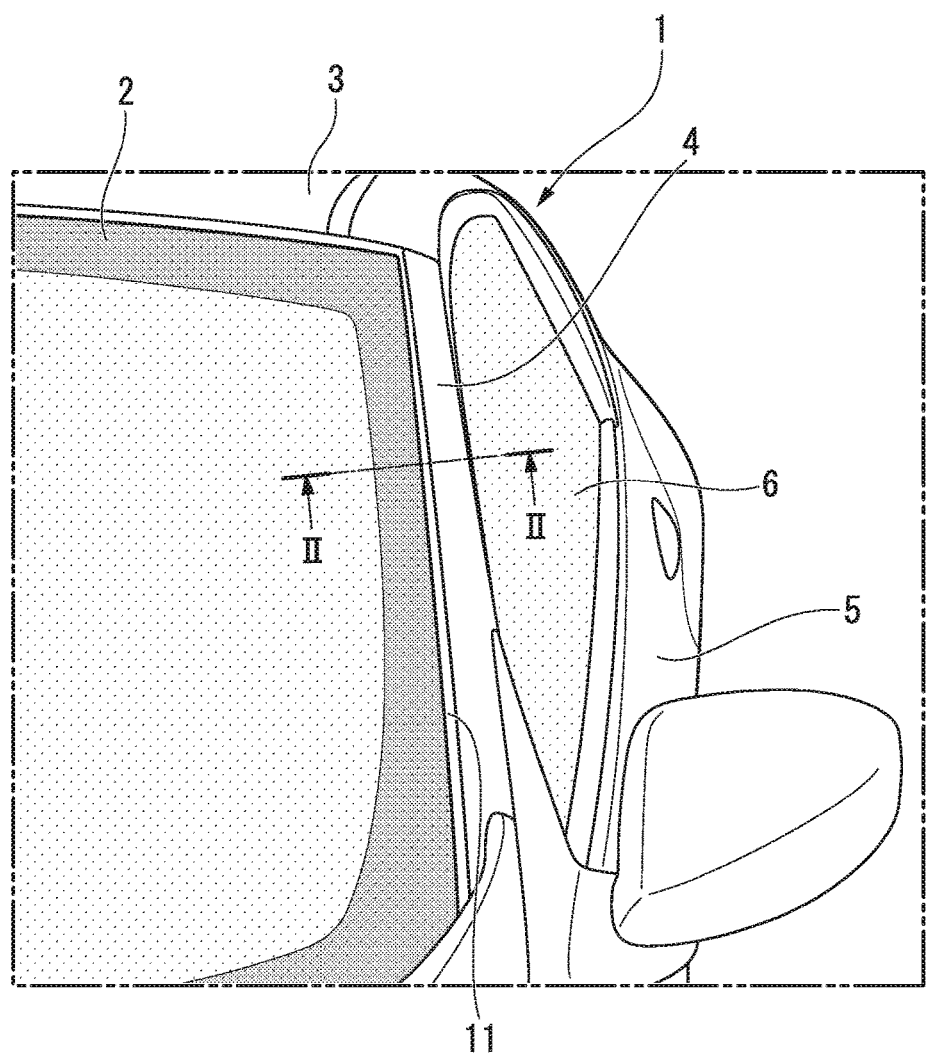
FIG. 1 is a perspective view of a vehicle according to an embodiment of the present invention.

FIG. 1 is a perspective view of a part of a vehicle 1 adopting a drainage structure for a windshield according to the embodiment when seen obliquely downward from a left front side.

A windshield 2 is disposed at a front of a vehicle cabin of the vehicle 1, and a front pillar 4 extending from a roof portion 3 of a vehicle body in a downward direction of an inclined front portion thereof is disposed on a side portion of the windshield 2. Further, a reference numeral 5 in FIG. 1 indicates a left front door, and a reference numeral 6 is a side glass which is held by the front door 5 to be movable up and down.

Figure 2:
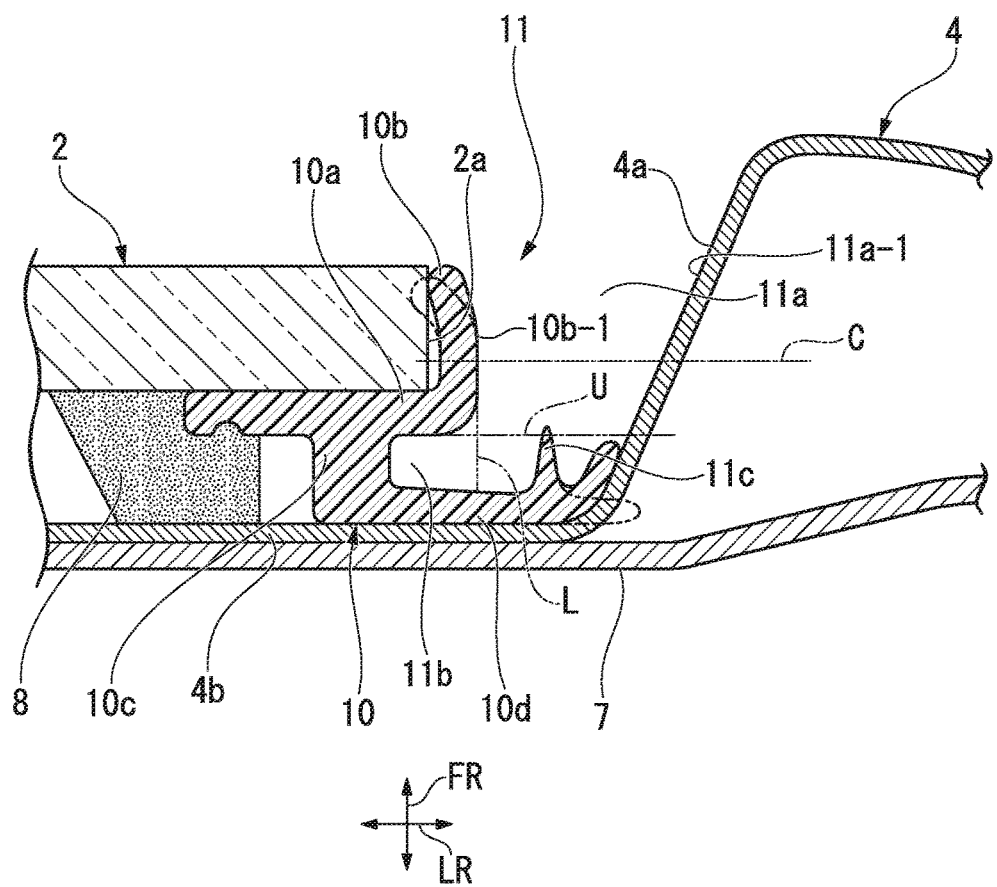
FIG. 2 is a cross-sectional view along a cross section II-II of FIG. 1 in the vehicle according to the embodiment of the present invention.

FIG. 2 is a view illustrating a cross section corresponding to a cross section II-II of FIG. 1.

As illustrated in the drawing, the front pillar 4 has an opposite wall 4a which faces a side end 2a of the windshield 2 installed at the vehicle body. The opposite wall 4a is inclined with respect to the side end 2a of the windshield 2 to be opened outward toward a front FR side of the vehicle body.

Further, a glass attachment wall 4b extending toward a rear surface side of a side edge portion of the windshield 2 is provided on the front pillar 4. The glass attachment wall 4b is joined to a base member 7 on a body side forming a window frame portion of the windshield 2. A rear surface of the windshield 2 is fixed to the glass attachment wall 4b by an adhesive 8 at a position which is spaced a predetermined distance inward from the side end 2a of the windshield 2 in a vehicle width direction LR.

Also, a weather strip 10 for sealing the side portion of the windshield 2 to the vehicle 1 is installed at the side edge portion of the windshield 2. The weather strip 10 includes an attachment base portion 10a which is joined to the rear surface of the side edge portion of the windshield 2, a seal lip 10b which is bent along the side end 2a of the windshield 2 from the attachment base portion 10a and is in close contact with the side end 2a of the windshield 2, a dam portion 10c which extends from the attachment base portion 10a toward the glass attachment wall 4b and is in contact with the glass attachment wall 4b, and a pillar seal wall 10d which extends from the dam portion 10c along a front surface of the glass attachment wall 4b toward the opposite wall 4a of the front pillar 4 and is in close contact with the front pillar 4. The dam portion 10c is disposed outside (outward in the vehicle width direction LR) of the adhesive 8 which adheres the windshield 2 to the front surface of the glass attachment wall 4b, and restricts the adhesive 8 from leaking outward. Further, the dam portion 10c serves as a spacer for spacing the windshield 2 forward from the glass attachment wall 4b by a predetermined height.

A drainage groove 11 which is recessed concavely inside the vehicle cabin to capture water in the recessed portion and to discharge the captured water downward is formed between the weather strip 10 integrally provided on the side edge portion of the windshield 2 and the opposite wall 4a of the front pillar 4.

Further, in the embodiment, an outer surface of the seal lip 10b of the weather strip 10 forms a side end surface 10b-1 on the windshield side.

The drainage groove 11 includes a basic groove portion 11a which opens to a front surface side of the windshield 2 between the side end surface 10b-1 on the windshield side and the opposing wall 4a of the front pillar 4, an expansion groove 11b which is provided to expand from a bottom side of the basic groove portion 11a to an inside of the windshield 2 in the vehicle width direction (which is recessed inward in the vehicle width direction), and a wall portion 11c which protrudes from a bottom (the pillar seal wall 10d) of the basic groove portion 11a toward an opening 11a-1 side of the basic groove portion 11a.

In the embodiment, the basic groove portion 11a is formed by the seal lip 10b (the side end surface 10b-1) of the weather strip 10, a part of the pillar seal wall 10d, and the opposite wall 4a of the front pillar 4.

The expansion groove 11b is formed by an outer surface of the dam portion 10c of the weather strip 10 in the vehicle width direction LR, a lower surface of the attachment base portion 10a facing the outer surface and a part of an upper surface of the pillar seal wall 10d. In the case of the embodiment, an inner wall on the inner side of the expansion groove 11b in the vehicle width direction is located closer to the inner side in the vehicle width direction than the side end surface 10b-1 on the windshield side and the side end 2a on the windshield 2. Specifically, the expansion groove 11b is formed so as to be inserted into a separation space secured by the dam portion 10c of the weather strip 10 between the glass attachment wall 4b and the side edge portion of the windshield 2. Further, a reference L of FIG. 2 indicates a boundary position between the basic groove portion 11a and the expansion groove 11b, and a reference U indicates a position of an upper end of the expansion groove 11b.

The wall portion 11c protrudes from a substantially intermediate position of the bottom of the basic groove portion 11a between the side end surface 10b-1 on the windshield side and the opposing wall 4a of the front pillar 4. Additionally, the wall portion 11c is formed to have an approximately triangular cross-sectional shape which converges from a base end on the bottom side of the basic groove portion 11a toward an extending end side thereof.

Further, the wall portion 11c extends to a region of the basic groove portion 11a closer to the opening 11a-1 than the position U of the upper end of the expansion groove 11b. More specifically, an extending end of the wall portion 11c is located at a position closer to the bottom of the basic groove portion 11a than a center position c in a forward and backward direction FR of the vehicle body in the region of the basic groove portion 11a closer to the opening 11a-1 than the position U of the upper end of the expansion groove 11b.

Figure 3:
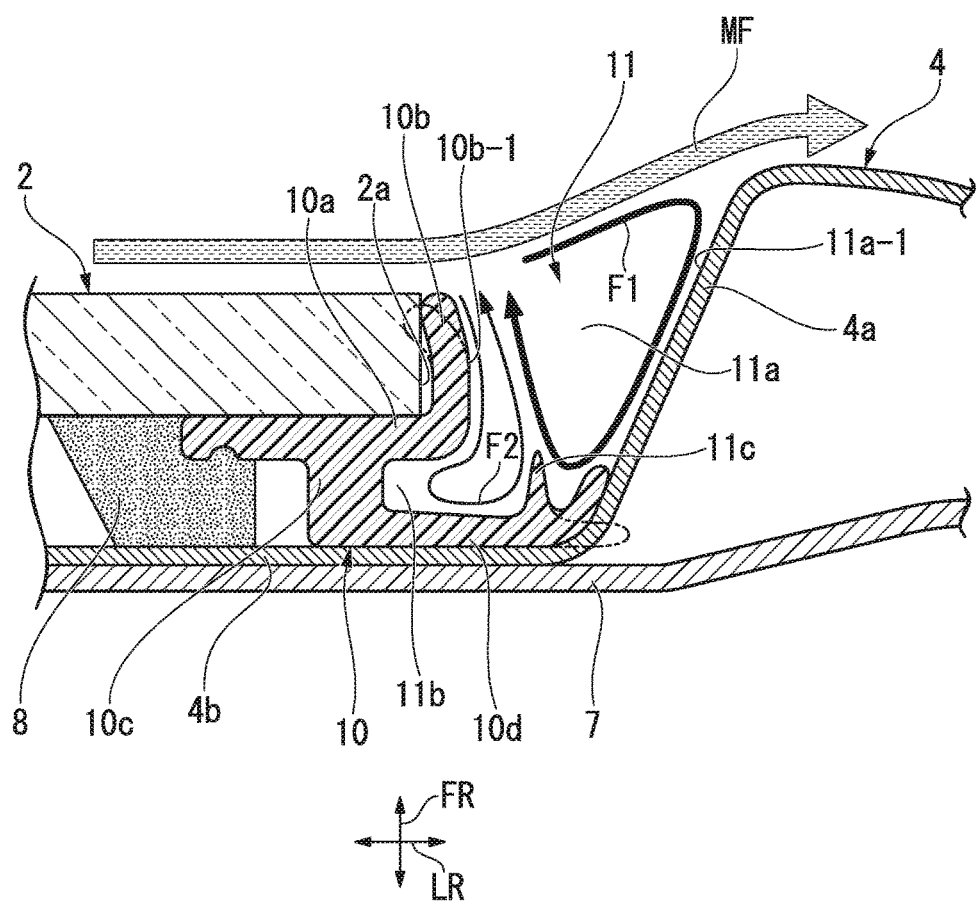
FIG. 3 is a cross-sectional view along the cross section II-II of FIG. 1 in the vehicle according to the embodiment of the present invention.

FIG. 3 is a view illustrating a flow of travel wind during travel of the vehicle with an arrow. Hereinafter, a flow of rainwater in the drainage groove 11 during travel in rain will be described with reference to FIG. 3.

During the travel of the vehicle, the travel wind hitting the front surface of the windshield 2 flows from the side portion of the windshield 2 to the side of the vehicle body beyond the front pillar 4, as indicated by an arrow MF in FIG. 3. A main flow MF of the travel wind draws air in the basic groove portion 11a to follow the main flow MF in a region on the opening 11a-1 side of the basic groove portion 11a of the drainage groove 11 by viscosity of the air. At this time, a first swirling flow F1 which swirls in the basic groove portion 11a is generated by the drawing due to the main flow MF. The first swirling flow F1 swirls to flow along the opposite wall 4a of the front pillar 4 toward the bottom side of the basic groove portion 11a and then to rise along the outer surface of the wall portion 11c in the vehicle width direction.

Further, when the first swirling flow F1 is generated in the basic groove portion 11a as described above, a flow of the first swirling flow F1 rising along an outer surface of the wall portion 11c in the vehicle width direction draws new air in the drainage groove 11. When the new air is drawn in this manner, a second swirling flow F2 which swirls in a region inside the drainage groove 11 near the expansion groove 11b due to the drawing is generated. The second swirling flow F2 swirls to flow from a portion of the opening 11a-1 of the basic groove portion 11a near the side end surface 10b-1 on the windshield 2 side toward the inner wall on the inner side of the expansion groove 11b in the vehicle width direction and then to rise along an inner surface of the wall portion 11c in the vehicle width direction.

When the first swirling flow F1 and the second swirling flow F2 are generated in the drainage groove 11 during the travel of the vehicle as described above, the water such as rainwater which hits the front surface of the windshield 2 and flows near the side end surface 10b-1 is drawn in the basic groove portion 11a and the expansion groove 11b of the drainage groove 11 by the first swirling flow F1 and the second swirling flow F2. In particular, water droplets which are transferred from a surface of the windshield 2 to an end on the drainage groove 11 side are carried on the second swirling flow F2 and drawn into the drainage groove 11, and thus the droplets can be suppressed from being carried over the front pillar 4 by the main flow MF.

As described above, in the drainage structure according to the embodiment, during the travel of the vehicle, the main flow MF of the travel wind can cause the first swirling flow F1 which swirls to flow along the opposite wall 4a of the front pillar 4 to the bottom side of the basic groove portion 11a and then to rise along the outer surface of the wall portion 11c in the vehicle width direction, and the second swirling flow F2 which swirls to flow from the portion near the side end surface 10b-1 on the windshield 2 side toward the inner wall on the inner side of the expansion groove 11b in the vehicle width direction and then to rise along the inner surface of the wall portion 11c in the vehicle width direction. Therefore, even when a large amount of water flows from the front surface side of the windshield 2 in a direction of the drainage groove 11 during the travel of the vehicle, the water can be stably discharged to the outside through the drainage groove 11 by a drawing action of the first swirling flow and the second swirling flow.

Therefore, when such a drainage structure is adopted, the water that passes over the front pillar 4 and is scattered to the side of the vehicle body from the drainage groove 11 can be reduced, and a protrusion height of the front pillar 4 can also be lowered to reduce a level difference between the windshield 2 and the front pillar 4, and thus occurrence of wind noise can be reduced, and an external appearance can be improved.

Further, in the drainage structure according to the embodiment, a part of the expansion groove 11b is inserted into the separation space between the side edge portion of the windshield 2 and the glass attachment wall 4b. Therefore, an effective cross-sectional area capable of capturing the water in the drainage groove 11 can be sufficiently secured at the expansion groove 11b. As a result, a width of the basic groove portion 11a facing the outside of the vehicle body can be further reduced, or the opposite wall 4a of the front pillar 4 can be further lowered. Therefore, appearance quality of the vehicle can be further enhanced.

Particularly, in the case of the embodiment, since the inner wall on the inner side of the expansion groove 11b in the vehicle width direction is constituted by the outer surface of the dam portion 10c, which also serves as a spacer, in the vehicle width direction, the cross-sectional area of the expansion groove 11b can be enlarged without an increase in the number of parts or complication of the structure.

Further, in the drainage structure according to the embodiment, the wall portion 11c in the drainage groove 11 is provided at an approximate center position of the basic groove portion 11a between the side end surface 10b-1 of the windshield side and the opposite wall 4a of the front pillar 4. Therefore, the first swirling flow F1 and the second swirling flow F2 generated in the drainage groove 11 during the travel of the vehicle are divided at the approximate center position between the side end surface 10b-1 and the opposite wall 4a. Therefore, one of the first swirling flow F1 and the second swirling flow F2 is prevented from being drowned out by the other one, and the first swirling flow F1 and the second swirling flow F2 are formed in a well-balanced manner so that drainage performance in the drainage groove 11 is stabilized.

Further, in the drainage structure according to the embodiment, since the wall portion 11c in the drainage groove 11 extends to a region closer to the opening 11a-1 than the position U of the upper end of the expansion groove 11b in the basic groove portion 11a, the flow of the first swirling flow F1 from the opposite wall 4a of the front pillar 4 toward the bottom of the basic groove portion 11a is blocked by the extending end of the wall portion 11c, and thus it is difficult for the flow to directly pass over the wall portion 11c and enter the expansion groove 11b side. Accordingly, the flow of the second swirling flow F2 drawn into the expansion groove 11b from the side end surface 10b-1 on the windshield side is not easily obstructed.

Further, in the drainage structure according to the embodiment, the extending end of the wall portion 11c is located at a position closer to the bottom of the basic groove portion 11a than the center position c in the forward and backward direction FR of the vehicle body in the region closer to the opening than the expansion groove 11b of the basic groove portion 11a. Accordingly, the extending end of the wall portion 11c becomes less visible from the outside through the opening 11a-1 of the basic groove portion 11a, and the appearance quality is enhanced.

The wall portion 11c adopted in the drainage structure according to the embodiment is not provided to directly capture the water flowing into the drainage groove 11 from the side end surface 10b-1 on the windshield side but is provided to generate the first swirling flow F1 and the second swirling flow F2 in the groove 11. Accordingly, even if a position of the extending end of the wall portion 11c is set to be low as described above, no problems occur on a drainage surface.

The present invention is not limited to the above-described embodiment, and various design changes are allowed without departing from the gist thereof.

REFERENCE SIGNS LIST

2 Windshield
2a Side end
4 Front pillar
4a Opposite wall
4b Glass attachment wall
16
10b-1 Side end surface
10c Dam portion (spacer)
11 Drainage groove
11a Basic groove portion
11a-1 Opening
11b Expansion groove
11c Wall portion
c Center position in forward and backward direction

The invention claimed is:

1. A drainage structure for a windshield which comprises a windshield disposed at a front of a vehicle cabin, a front pillar disposed outside the windshield in a vehicle width direction, and a drainage groove recessed concavely toward an inside of the vehicle cabin between the windshield and the front pillar and configured to discharge captured water downward,
   wherein the drainage groove comprises a basic groove portion that opens toward a front surface side of the windshield between a side end surface on the windshield side and an opposite wall of the front pillar facing the side end surface, an expansion groove recessed concavely toward an inside of the windshield in the vehicle width direction from a bottom side of the basic groove portion, and a wall portion configured to protrude toward an opening side of the basic groove portion from a position of the bottom of the basic groove portion which is spaced apart in the vehicle width direction from each of the side end surface on the windshield side and the opposite wall of the front pillar.

2. The drainage structure according to claim 1, wherein a glass attachment wall extending toward a rear surface side of a side portion of the windshield extends from the front pillar, a side edge portion of the windshield is disposed to be spaced apart from the glass attachment wall toward a front side of a vehicle, and at least a part of the expansion groove is provided in a separation space between the side edge portion of the windshield and the glass attachment wall.

3. The drainage structure according to claim 2, wherein a portion of a rear surface of the windshield which is spaced inward from a side end of the windshield in the vehicle width direction is supported by the glass attachment wall via a spacer, and an inner wall on an inner side of the expansion groove in the vehicle width direction is constituted by an outer surface of the spacer in the vehicle width direction.

4. The drainage structure according to claim 1, wherein the wall portion is provided at an approximate center position of the basic groove portion between the side end surface on the windshield side and the opposite wall of the front pillar.

5. The drainage structure according to claim 1, wherein the wall portion extends to a region closer to the opening than the expansion groove of the basic groove portion.

6. The drainage structure according to claim 5, wherein an extending end of the wall portion is located at a position closer to the bottom of the basic groove portion than a center position in a forward and backward direction of the vehicle in the region closer to the opening than the expansion groove of the basic groove portion.

\* \* \* \* \*